July 28, 1925.
A. JACKSON
JOINT CONNECTION FOR TIMBER FRAMING
Filed Sept. 27, 1920  4 Sheets-Sheet 1
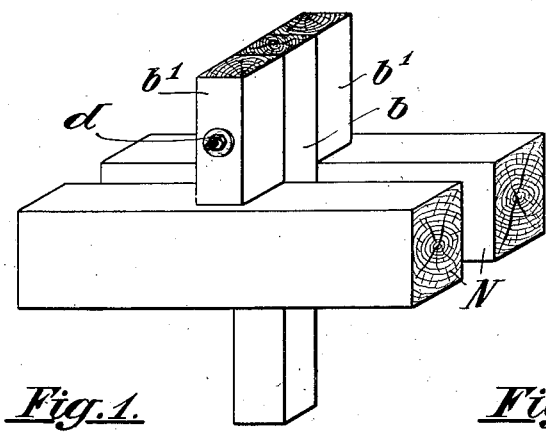
Fig. 1.
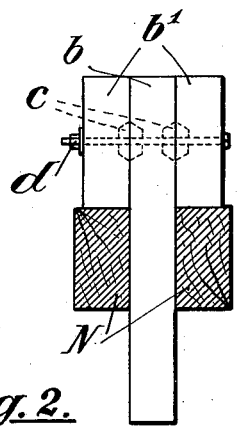
Fig. 2.
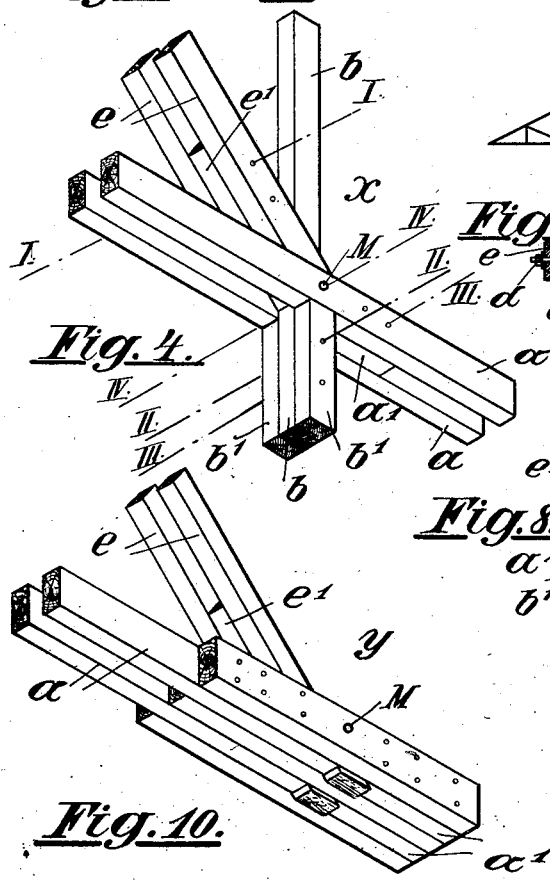
Fig. 4. Fig. 10.
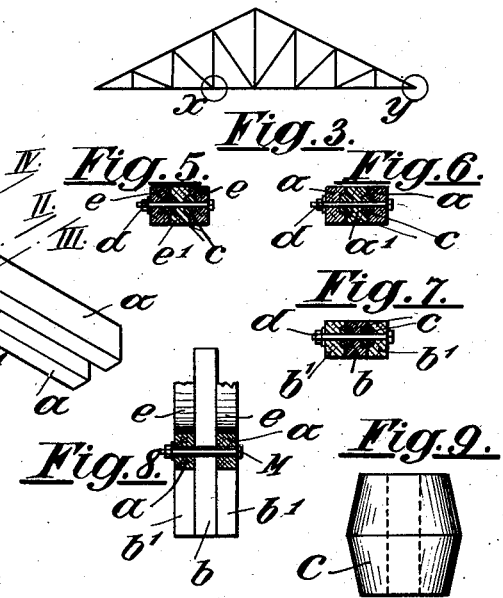
Fig. 3. Fig. 5. Fig. 6. Fig. 7. Fig. 8. Fig. 9.
Fig. 9ª.
Inventor –
Alfred Jackson.
By B. Singer, Atty.

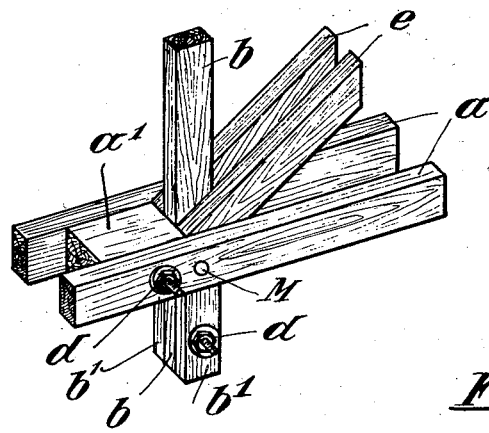
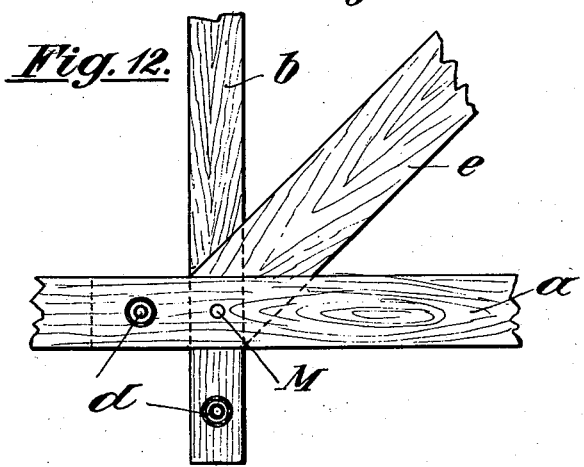
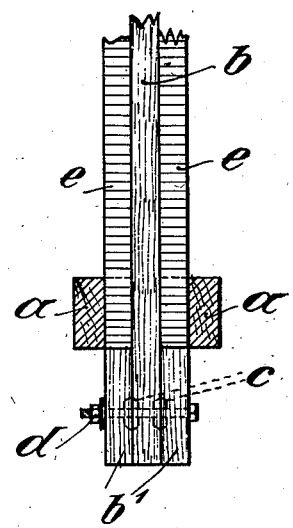
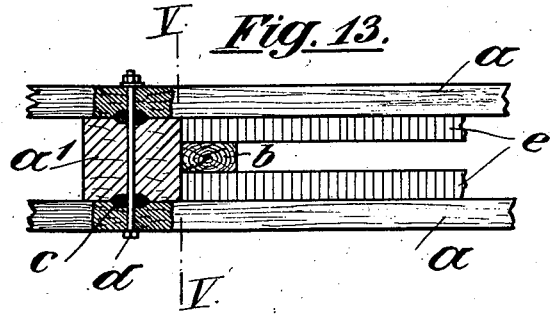

July 28, 1925.  
A. JACKSON  
JOINT CONNECTION FOR TIMBER FRAMING  
Filed Sept. 27, 1920  
1,547,755  
4 Sheets-Sheet 3

Inventor  
Alfred Jackson  
By B. Singer, Atty.

July 28, 1925.
A. JACKSON
JOINT CONNECTION FOR TIMBER FRAMING
Filed Sept. 27, 1920 4 Sheets-Sheet 4
1,547,755
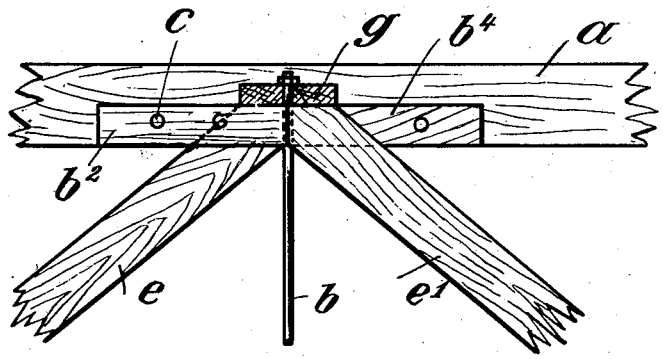
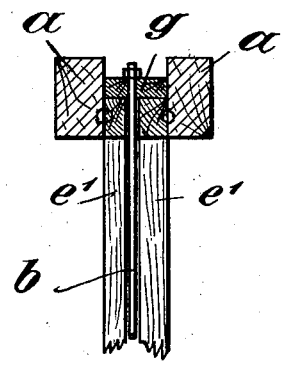
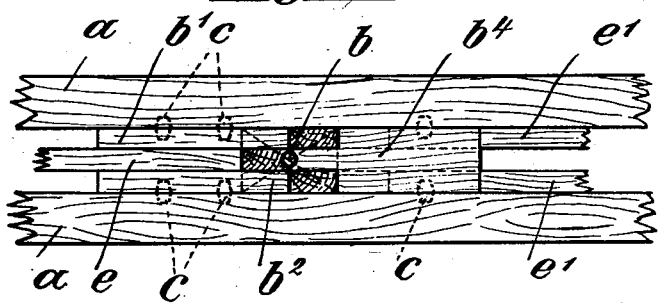
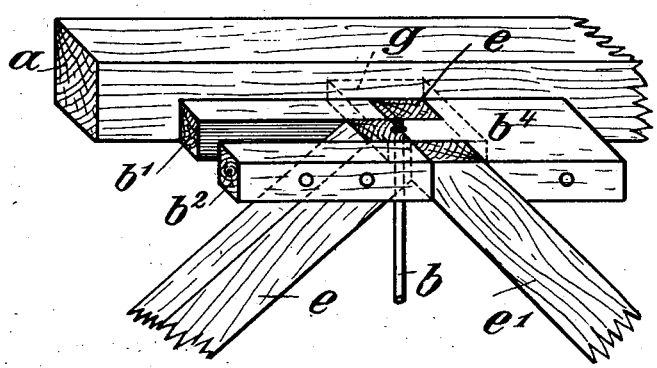
Inventor-
Alfred Jackson,
By B. Singer, Atty.

Patented July 28, 1925.

1,547,755

UNITED STATES PATENT OFFICE.

ALFRED JACKSON, OF STUTTGART, GERMANY.

JOINT CONNECTION FOR TIMBER FRAMING.

Application filed September 27, 1920. Serial No. 413,228.

*To all whom it may concern:*

Be it known that I, ALFRED JACKSON, a citizen of the Republic of Wurttemberg, Germany, residing at Stuttgart, in the Republic of Wurttemberg, Germany, have invented certain new and useful Improvements in Joint Connections for Timber Framing (for which I have filed applications for patents in Germany, dated August 19 and March 11, 1919, respectively), of which the following is a specification.

This invention relates to improvements in joint connections for timber framing. According to the present invention pressure surfaces for the direct transmission of the strain in the axis of a bar to the other bars without any intermediate packing and connecting devices, are formed on all the bars that converge together at the joint, by means of filling and covering timbers which are connected by means of cylindrical or double conical dowels or intermediate pieces of wood, cast iron, mild steel or steel, and bolts passing through the same.

This construction can be employed also in butt joints, dowelled beams, and other structures in which shearing stresses are produced. The arrangement of the wooden filling or connecting pieces eliminates tensile stresses at right angles to the direction of the fibre of the timbers, and the compressive stresses at right angles to the direction of the fibre can be readily diminished to a permissible degree by increasing the pressure surface. In a joint of this kind the strains on the bars and the filling pieces can be correctly calculated, and the corresponding girders can be made very small and therefore very economically.

The drawings illustrate by way of example a number of constructional forms of this invention.

Figure 1 is a perspective of a joint connection for timber framing constructed and arranged in accordance with my invention.

Figure 2 is a section of the same.

Figure 3 is a diagram of a triangular truss in which another form of my invention is embodied.

Figure 4 is a perspective of the form of joint connection shown diagrammatically in Figure 3.

Figure 5 is a section on the line I—I of Figure 4.

Figure 6 is a similar view on the line II—II of Figure 4.

Figure 7 is a similar view on the line III—III of Figure 4.

Figure 8 is a similar view on the line IV—IV of Figure 4.

Figure 9 is a detailed elevation of one of the dowels.

Figure 9$^a$ is an end elevation of the same.

Figure 10 is a perspective of the bearing joint $y$ of the triangular truss shown in the diagram Figure 3.

Figure 11 is a perspective of a joint constructed in accordance with another modified form of my invention.

Figure 12 is an elevation of the same.

Figure 13 is a plan of the same.

Figure 14 is an elevation of the same at right angles to Figure 12.

Figure 15:
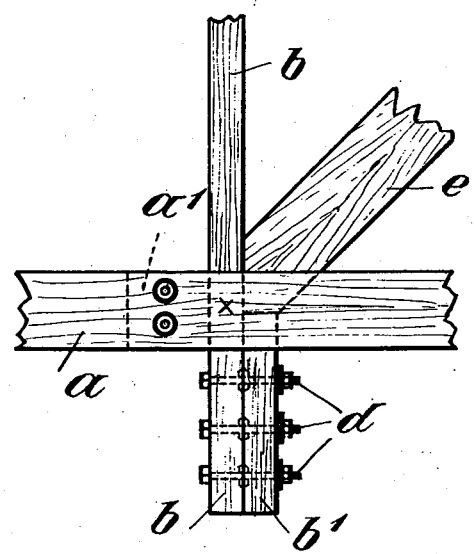

Figure 15 is an elevation of another modified form of my improved joint.

Figure 16:
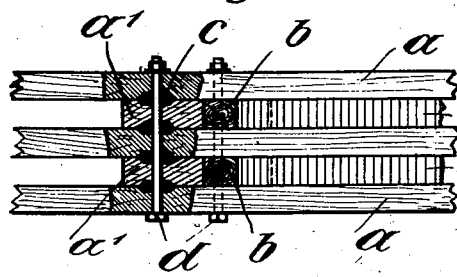

Figure 16 is an inverted plan of the same partly in section.

Figure 17:
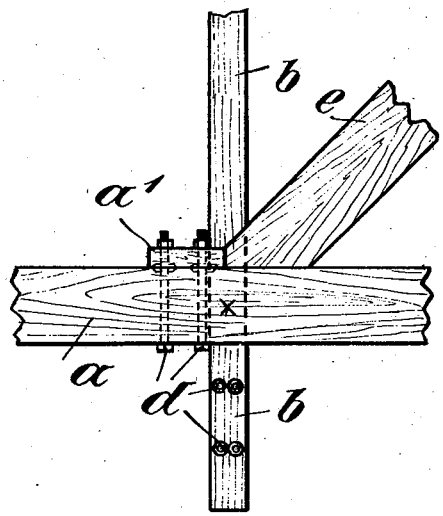

Figure 17 is an elevation of another modified form of my improved joint.

Figure 18:
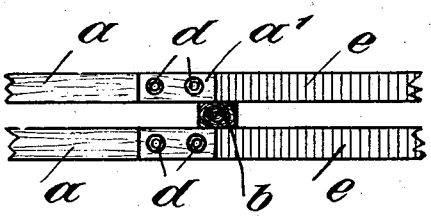

Figure 18 is a plan of the same.

Figure 19 is an elevation of another modified form of my invention especially adapted for arched roofs.

Figure 20 is a similar view at right angles to Figure 19.

Figure 21 is a plan of the same.

Figure 22 is a detail sectional perspective view of the same.

Figures 1 and 2 illustrate the suspension of a load from a beam which is secured against bending and which is composed of parallel timbers or main beams N. The truss or suspension post $b$ which serves to transmit the load has a width equal to the space between the two timbers N. For taking and transmitting the load two timbers $b^1$ acting as pressure transmitting members are mounted upon the head of the suspension post $b$ by means of dowels $c$. The beams $b^1$ have a cross section which is determined by the permissible compression stress at right angles to the direction of the fibre.

Figures 9 and 9$^a$ are a side elevation and a plan respectively of a dowel $c$ having the form of a rounded insertion piece. It has a central opening for the reception of the tie bolt $d$. This bolt does not cooperate in transmitting the strains to the timbers, but has solely the function of keeping the timbers together. The provision of round dowels $c$ thus causes all the longitudinal fibres that have not been severed to take a full share in resisting the stresses.

In this junction connection the bars are so arranged that their axes intersect one another at one point. The tensile strain acting in the suspension post $b$ is transmitted to the necessary number of dowels (formed as shown in Figs. 9 and 9$^a$) and by them to the covering timbers $b^1$. The latter have their round ends abutting against the undersides of the lower boom $a$. The struts $e$ transmit, by means of the dowels $a$, their horizontal lateral strains to the centre piece $e^1$. This centre or intermediate piece abuts against the wood of the suspension post $b$. The suspension post $b$ bears against the intermediate timber $a^1$ of the lower boom $a$ to which, likewise by means of dowels $c$, the difference between the strains in the adjacent lower boom bars $a$ is transmitted. The horizontal strains balance one another through the wood of the suspension post $b$, so that by the insertion of the intermediate timbers $a^1$, the wood is stressed in compression at right angles to the fibre.

Since the joint between the intermediate timber $e^1$ and the suspension post $b$ cannot take vertical strains, the vertical side strain of the strut strain cannot be balanced with the strain of the suspension post by means of the intermediate timber. On the contrary the strut can transmit its vertical strain only to the wood of the lower boom, and by means of the latter the vertical strains of the covering timbers $b^1$ are balanced. In this case also the wood is stressed only in a direction at right angles to the fibre.

The filling and reenforcing pieces are always so arranged as to avoid twisting strains in the trusses. The bolt M provided in the junction connection serves solely as an assembling bolt. The hole for it is therefore greater than the diameter of the bolt, so that subsidiary strains, due to shrinking and swelling of the timbers, are eliminated. Figure 10 illustrates the construction of the bearing joint $y$ of the triangular truss shown diagrammatically in Figure 3.

The upwardly inclined struts $c$ extend to the bearing, while the boom $a$ that crosses the struts is shifted, and filling pieces $a^1$ are inserted with the use of wedge-like dowels $c$. The filling pieces $a^1$, the whole of the cross section of which is utilized are designed to transmit the arising tensile strains to the struts $e$. At the point of intersection of the two axes of the bars there is likewise provided a loosely inserted assembling bolt M for balancing any subsidiary strains due to the shrinking and swelling of the wood or to variations in temperature, or to elastic deformations of shape, etc.

Trusses may be constructed as follows according to the present invention.

The several truss bars are prepared on the site of the job, the beams of the trusses are placed together and assembled. Then at the points where the dowels are situated, holes corresponding with the diameters of the fastening bolts, are bored. Then the beams are taken apart and the necessary conical or cylindrical recesses are cut out, for instance by means of centre bits, on the inner sides for the reception of the dowels. The dowels are then inserted between the timbers, and the fastening bolts for clamping these timbers together are passed through the bolt holes already bored for their reception. It is sufficient to provide one fastening bolt in say every third bolt hole, the other bolt holes being filled if desired with wooden plugs for sake of appearances. This form of construction is suitable not only for trusses of girder form but also for those of curved or arc shape.

If for want of space for the joints, ties and suspension post, etc., iron fish plates are employed in a truss, instead of the hereinbefore described intermediate timbers which, according to this invention, take the place of the joint plates ordinarily employed in iron structural work, semicylindrical or simply conical dowels are used. In this case the necessary fastening bolt which is required to take shearing stresses must have exactly the same diameter as the guide aperture in the insertion piece.

The advantages which are afforded by the use of the hereinbefore described hinge-like joint connection in wood are:

1. The construction of the joint connection according to calculation, in the form of a hinge, and a correct determination of the strains on the timbers.

2. Unimpeded "working" of the timbers in the case of changes of temperature, elastic modifications of shape, also in the case of shrinking and swelling of the wood, due to the loose arrangement of the assembling bolts.

3. An extremely simple transport and assembling due to the loose connection of the bars which can be assembled subsequently with ease at the job.

The packing pieces between these struts may also be dispensed with and be mounted between the stays or tie-bars, so that the horizontal and vertical components of the diagonal strains in the struts between which the suspension post provided with covering timbers is situated, are transmitted directly to the covering timbers of the suspension post and also to the intermediate piece situated between the tie-bars. This affords a further important advantage, namely, the action of shrinking at right angles to the fibre of the tie-bars and the suspension post is completely eliminated as regards the elastic working of the construction because the strut or diagonal and intermediate piece does not bear directly against the tie-bars but abuts against the suspension post. Such constructions are illustrated by way of example in Figures 11 to 22.

In this arrangement the bars are so arranged and the joint connection so constructed as to cause the axes of the bars to intersect one another in a vertical line in the mathematical point of junction represented by the assembling screw.

In the arrangement illustrated in Figures 11 to 14 an intermediate timber $a^1$ is arranged between the tie-bars $a$ of the boom. The two diagonals or struts $e$ are situated, also between those tie-bars. Between the struts there is situated the suspension post $b$ on both sides of which the two bearing pieces $b^1$ are superposed on the lower surface of the tie-bar. These pieces $b^1$ are connected to the suspension post $b$ by means of dowels $c$ and assembling bolts $d$. The intermediate part $a^1$ is connected to the tie-bars $a$ likewise by means of dowels and fastening bolts. The assembling bolt M is arranged at the theoretical junction point and is designed to hold the structure together during the erection thereof. In this case the intermediate timbers $a^1$ are no longer used between the struts $e$, but only between the tie-bars, $a$. By this means the horizontal and vertical components of the diagonal strains are transmitted directly to the bearing pieces $b^1$ of the suspension post $b$, or directly to the intermediate timber $a^1$ situated between the tie-bars $a$. Consequently the action due to shrinking at right angles to the direction of the fibre of the tie-bar and the suspension post is eliminated, because the struts $e$ with their intermediate piece $a^1$ do not bear directly upon the tie-bars $a$ but abut against the suspension post $b$.

In the modification illustrated in Figures 15 and 16 comprising three tie-bars $a$, the struts $e$ bear upon the bearing pieces $b^1$ that are fixed to the sides of the suspension post $b$, while the horizontal component is transmitted through the suspension post $b$ to the two intermediate pieces $a^1$.

Figures 17 and 18 illustrate a construction in which the intermediate piece $a^1$ is constructed as a covering timber, since it rests upon the tie-bars $a$. A timber $a^1$ of this kind is fixed to each tie-bar $a$ so that the struts $e$ likewise bear against the timbers $a^1$.

A further modification is represented by the Figures 19 to 22. This construction is designed for arched roofs, in which a diagonal strut comes in action simultaneously with the suspension post.

In this arrangement the boom stressed in tension consists of two bars $a$ between which the diagonal downwardly extending struts $ee^1$ are interposed.

The strut $e$ on the left hand side of the drawing is composed of one bar, while the strut shown on the right hand side consists of two bars $e^1e^1$. The strut $e$ passes through two filling pieces $b^1b^2$ fixed between the bars $a$ of the boom by means of dowels $c$ and screws $d$, while the struts $e^1e^1$ are arranged on both sides of the filling piece $b^4$ filling out the whole space between the two boom bars $a$. The front part of the filling piece $b^4$ is for this purpose formed as a pin.

Between the struts $e$ $e^1$ passes the suspension post formed as a round iron bar with a screw part on the upper side and provided with a covering piece $g$ from hard wood or iron for transmitting theoretically the compression.

This construction is in the case of alternating actions enabled to transmit the inner tensions arising especially in buildings of halls owing to unilateral wind pressure correctly to the wooden bars.

What I claim and desire to secure by Letters Patent is:—

1. Joint connection for timber framing comprising a pair of substantially parallel main beams disposed in spaced relation, a truss post extending between and at an angle to said beams, a pressure transmitting member on either side of and in contact with said truss post, each member bearing loosely against one of said beams and means for preventing relative displacement between said post and said members.

2. Joint connection for timber framing comprising a pair of substantially parallel main beams disposed in spaced relation, a truss post extending between and at an angle to said beams, a pressure transmitting member on either side of and in contact with said truss post, each member bearing loosely against one of said beams, means for preventing relative longitudinal displacement between said post and said members, and separate means for holding said post and said members in contact with one another.

3. Joint connection for timber framing comprising a pair of substantially parallel main beams disposed in spaced relation, a truss post extending between and at an angle to said beams, a pressure transmitting member on either side of and in contact with said truss post, each member bearing loosely against one of said beams, and dowels disposed between and extending transversely into contacting portions of said post and said members so as to prevent relative longitudinal displacement thereof.

4. Joint connection for timber framing comprising a pair of substantially parallel main beams disposed in spaced relation, a truss post extending between and at an angle to said beams, a pressure transmitting member on either side of and in contact with said truss post, each member bearing loosely against one of said beams, means for preventing relative longitudinal displacement between said post and said members, separate means for holding said post and said members in contact with one another, and a tie bolt extending with a clearance through perforations in said truss post and said means.

5. Joint connection for timber framing comprising a pair of substantially parallel main beams disposed in spaced relation, a truss post extending between and at an angle to said beams, a pressure transmitting member on either side of and in contact with said truss post, each member bearing loosely against one of said beams, a dowel disposed between and extending transversely into contacting portions of each pressure transmitting member and said truss post, and a tie bolt extending with a clearance through perforations of said truss post and said dowels.

In testimony whereof I affix my signature in presence of two witnesses.

DR. ING. ALFRED JACKSON.

Witnesses:
KARL BOSCH,
EMMA FAISER.